(12) United States Patent
Faille et al.

(10) Patent No.: US 9,469,373 B2
(45) Date of Patent: Oct. 18, 2016

(54) DRIVETRAIN SYSTEM FOR AN ELECTRICALLY ASSISTED HUMAN POWERED VEHICLE

(71) Applicant: VeloMetro Mobility Inc., Vancouver (CA)

(72) Inventors: Jonathan Faille, Gibsons (CA); Kody Jensen Baker, North Vancouver (CA); Benjamin John Cornwell-Mott, Vancouver (CA)

(73) Assignee: VeloMetro Mobility Inc., Vancouver (CA)

( * ) Notice: Subject to any disclaimer, the term of this patent is extended or adjusted under 35 U.S.C. 154(b) by 61 days.

(21) Appl. No.: 14/574,121

(22) Filed: Dec. 17, 2014

(65) Prior Publication Data

US 2016/0176473 A1 Jun. 23, 2016

(51) Int. Cl.
*B62M 6/50* (2010.01)
*B62M 6/55* (2010.01)

(52) U.S. Cl.
CPC ........ *B62M 6/55* (2013.01); *B62M 6/50* (2013.01)

(58) Field of Classification Search
CPC .......... B62M 6/55; B62M 6/50; B62M 6/60; B62M 6/70; B62M 6/40
USPC ...................................... 180/205.1
See application file for complete search history.

(56) References Cited

U.S. PATENT DOCUMENTS

| | | | | |
|---|---|---|---|---|
| 4,280,581 A * | 7/1981 | Rudwick | ................ | B62M 6/90 180/206.5 |
| 5,487,442 A * | 1/1996 | Hua | .................... | B62K 11/10 180/220 |
| 6,957,129 B2 * | 10/2005 | Hatanaka | ............ | B60L 11/1803 280/210 |
| 7,314,109 B2 * | 1/2008 | Holland | ................... | B62M 6/60 180/206.7 |
| 7,461,714 B2 * | 12/2008 | Holland | ................... | B62M 6/60 180/206.5 |
| 7,661,501 B1 * | 2/2010 | Perdue | ................. | B62K 3/005 180/2.1 |
| 2005/0029031 A1 * | 2/2005 | Thomas | .................. | B62M 6/45 180/206.5 |
| 2008/0156564 A1 * | 7/2008 | Driessen | ................... | B62J 7/04 180/220 |
| 2010/0181130 A1 * | 7/2010 | Chou | ...................... | B62M 6/40 180/206.7 |
| 2011/0001442 A1 * | 1/2011 | Lee | .......................... | B62M 6/45 318/139 |
| 2011/0056756 A1 * | 3/2011 | Murad | .................. | B62K 5/027 180/65.31 |
| 2011/0139530 A1 * | 6/2011 | Ananthakrishna | .. | B60L 11/1801 180/206.5 |

(Continued)

OTHER PUBLICATIONS

Patent Cooperation Treaty International Search Report with a mailing date of Mar. 2, 2016 issued for the parent application assigned International Application No. PCT/CA2015/051317 with an International Filing Date of Dec. 14, 2015.

(Continued)

*Primary Examiner* — Anne Marie Boehler
*Assistant Examiner* — Michael Stabley
(74) *Attorney, Agent, or Firm* — John R. Flanagan

(57) ABSTRACT

Pedal power provided by the driver is delivered to the drive wheel of a vehicle, aided when necessary by an electric motor and transmission. A second electric motor adds regenerative braking functionality and the ability to drive the vehicle in reverse. The second motor may also be used to drive the vehicle forwards, and power to the two motors may be split to optimize the efficiency, torque or power output of the drivetrain system. A freewheel mechanism allows the vehicle to be driven forwards by the first motor without back-driving the crank. An optional second freewheel mechanism allows the vehicle to move forwards without back-driving the first motor and the crank.

15 Claims, 8 Drawing Sheets

(56) References Cited

U.S. PATENT DOCUMENTS

| | | | |
|---|---|---|---|
| 2012/0303195 A1* | 11/2012 | Boyle | B62M 6/50 701/22 |
| 2013/0095971 A1* | 4/2013 | Hino | B62M 11/04 475/5 |
| 2014/0231163 A1* | 8/2014 | Stieger | B62M 6/40 180/206.4 |

OTHER PUBLICATIONS

Patent Cooperation Treaty Written Opinion of the International Searching Authority with a mailing date of Mar. 2, 2016 issued for the parent application assigned International Application No. PCT/CA2015/051317 with an International Filing Date of Dec. 14, 2015.

* cited by examiner

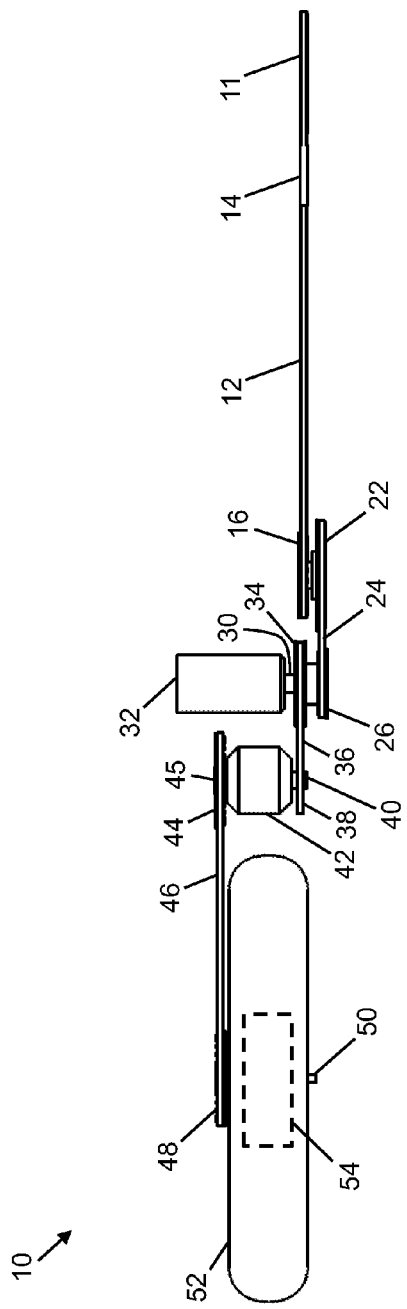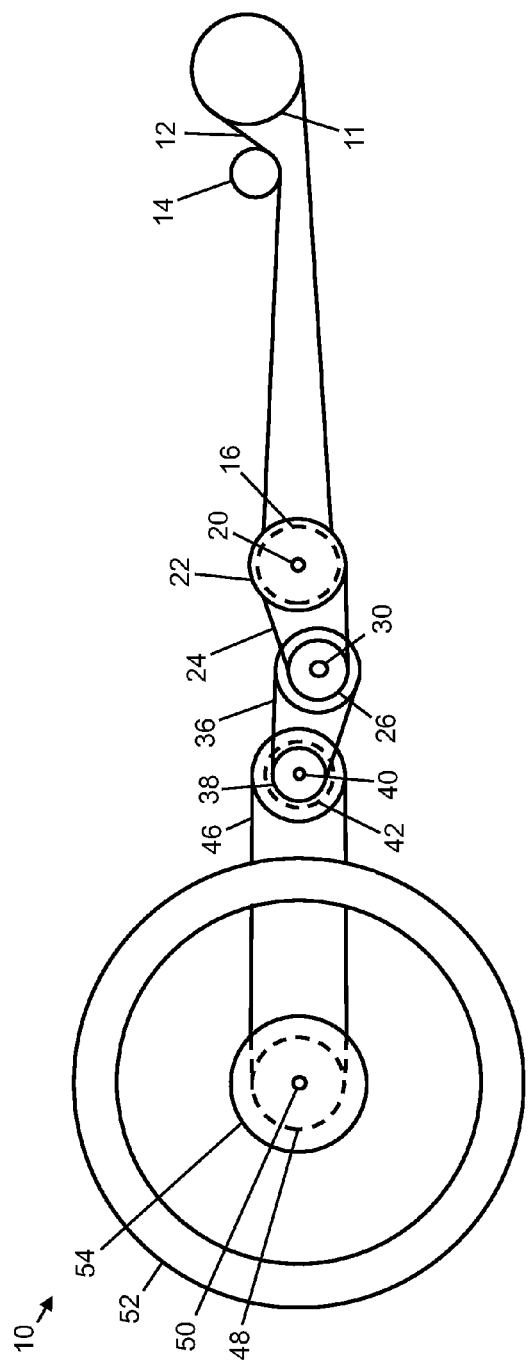

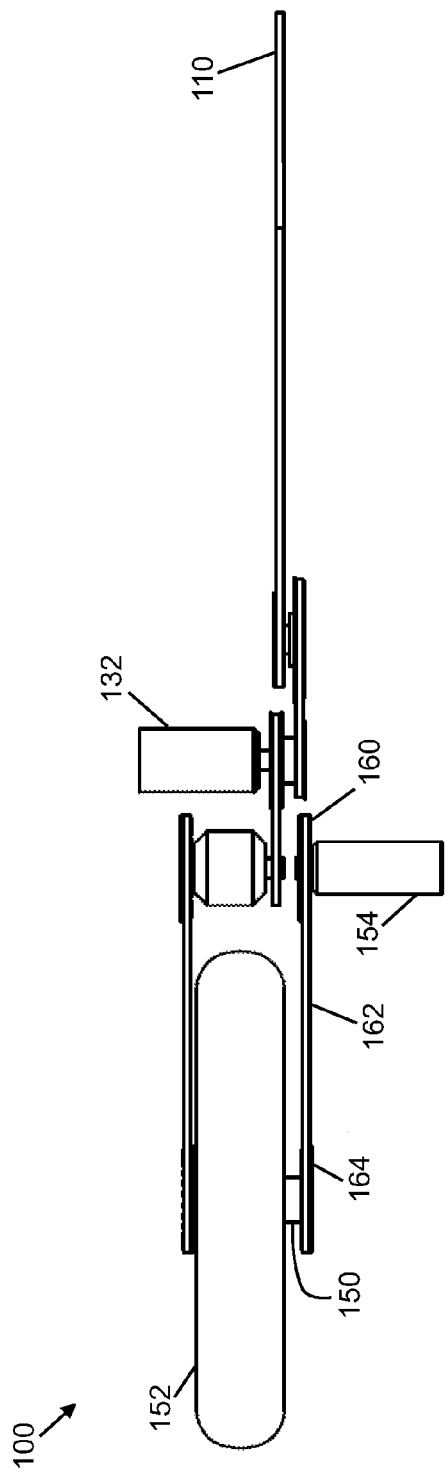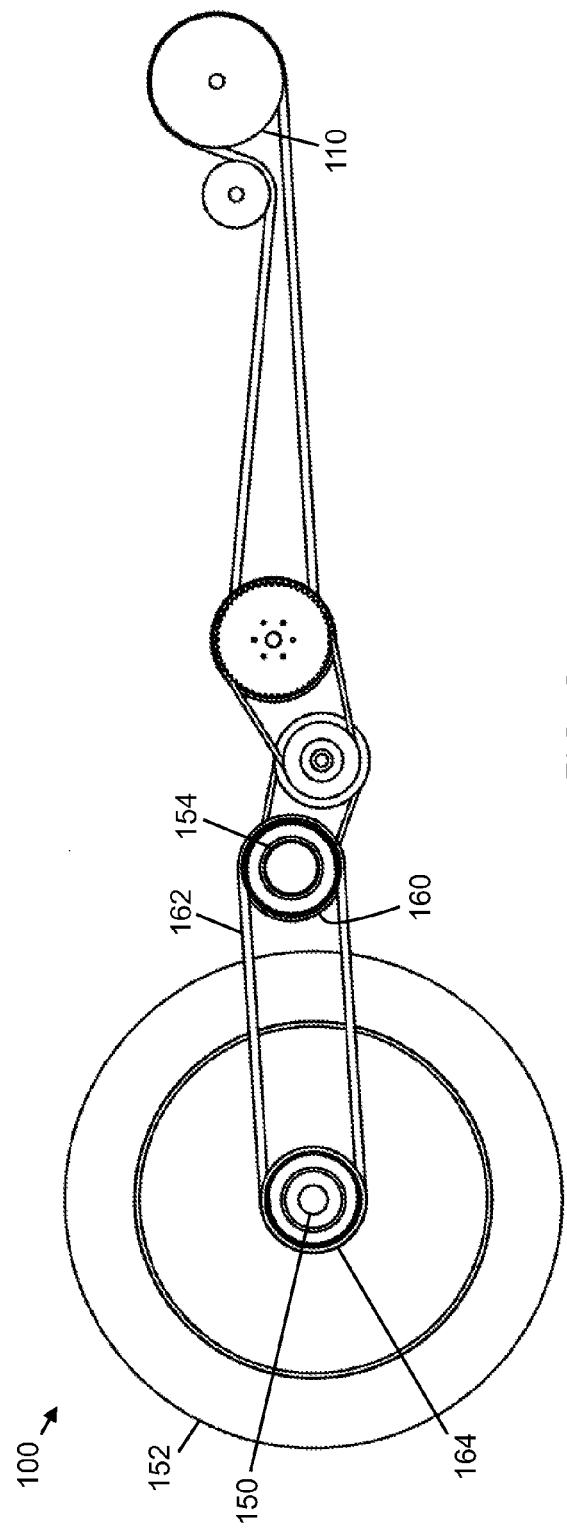
FIG. 5
FIG. 6

DRIVETRAIN SYSTEM FOR AN ELECTRICALLY ASSISTED HUMAN POWERED VEHICLE

TECHNICAL FIELD

This application relates to human powered vehicles. In particular, it relates to a drivetrain for a human powered, electrically assisted vehicle.

BACKGROUND

Motorized pedal power vehicles consist of an attached motor and a transmission that is used to either power the vehicle unassisted, or to assist with pedaling. An example of a motorized pedal power vehicle is a motorized bicycle. Motorized bicycles have been gaining increasing attention in North America, Asia, Europe and elsewhere throughout the world. Advantages include lower energy costs; reduction in other costs such as insurance, licenses, registration, parking; improved traffic flow; environmental friendliness; as well as various health benefits for the user.

Different types of motors and power sources can power motorized pedal power vehicles. Common power sources include internal combustion engines fuelled by gasoline and/or diesel, steam engines, air engines, as well as electric motors. These power sources may be directly connected to an output shaft or geared to adjust the output speed and torque. Power can be applied to a drive wheel using different methods: (1) The front or rear wheel may be powered directly by a power source built into the hub, wheel or rim. (2) A power source mounted within the vehicle's frame may drive the rear wheel via a mechanical power transmission system such as via "chain drives" (i.e. a sprocket with a chain), "belt drives" (e.g. a rubber belt), or "shaft drives" (i.e. directly coupled with a rigid shaft). (3) Power may be transferred to a wheel from a motor mounted directly above, by bringing a powered roller or rubber belt into contact with the wheel or tire.

Commercially, motorized pedal power vehicles are marketed either as complete designs or as add-on motor kits for use on unpowered vehicles. Lighter and more powerful batteries enable electric motors to be more commonly used in motorized pedal power vehicles. As well, such technologies have proven useful for people with physical disabilities and/or restricted mobility such as arthritis and knee injuries.

Companies manufacture internal combustion engine motor conversion kits for conventional bicycles. Examples include: (i) rear-engine, rack-mounted kits using a belt to drive the rear wheel; (ii) rack-mounted, chain-driven, geared transmission; as well as (iii) rack-mounts with either a tire roller-mount or a chain-driven, geared transmission.

Motorized bicycles using electric motors use batteries that are limited in capacity and range, thus pedaling is used to assist in propulsion. Such electric motor bicycle designs are increasingly popular, particularly in countries with heavy traffic congestion, aging populations and fuel shortages.

U.S. Pat. No. 3,921,467 to Matsuura describes a bicycle with a drive train located in the center of the cycle body that consists of a primary sprocket and final sprocket with a tensioner sprocket in between. Adding a secondary sprocket between the primary and final sprockets can modify the gear ratios of the drive train.

U.S. Pat. No. 6,352,131 to Lin describes a unidirectional rotating assembly that allows a chain-ring to rotate while the crank and axle remains still. This design enables the bike to be propelled while the crank is stationary and allows the users to still be able to shift gears.

U.S. Pat. No. 7,314,109 to Holland describes an electrically powered bicycle that includes a hub motor that is mounted to the bicycle frame by its axle. When the bicycle is coasting, the design will enable the rear wheel to drive the motor to provide downhill, regenerative braking capability. U.S. Pat. No. 7,461,714 to Holland also describes a frame-mounted motor that is connected to pedals and to a rear driven wheel through an intermediate jackshaft. A freewheel within this design can recharge batteries during braking or while coasting downhill.

US Patent Application Pub. No. 2010/0307851 to Lin further describes a power-assist system for a bicycle comprising of three components: a motor, a speed-reduction section, and a power-assist section. Such systems operate in four modes: (1) power-assist pedaling mode; (2) pedal only mode; (3) power-assist only mode; and (4) coasting no-power mode.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to a drivetrain for a human powered, electrically assisted vehicle, such as a tricycle. The drivetrain, which includes two electrical motors, reduces the effort that a person needs to exert to move a vehicle, increases the acceleration and efficiency of the vehicle, recovers electrical energy when the vehicle is braking, and powers the vehicle to move in reverse. It accomplishes these solutions while accommodating freewheel mechanisms that allow the crank to remain stationary while the vehicle moves forward. The use of two motors in the drivetrain allows them to be operated within their higher efficiency performance zones, allowing for greater overall efficiency of the motors when converting stored electrical energy to kinetic energy in order to drive the vehicle.

This arrangement allows for greater torque to be applied to the rear wheel, while staying within restrictive power limits compared with other methods, such as installing a single hub motor on the rear wheel or a single mid-mount motor that drives the rear wheel.

Disclosed herein is a drivetrain system for a human-powered vehicle comprising: a crank configured to be rotated by a human; a shaft driven by the crank; a drive wheel configured to be driven by the shaft; a first motor configured to power the shaft; a first freewheel mechanism connected between the crank and the shaft such that the first motor powers the shaft to drive the drive wheel forwards without back-driving the crank; and a second motor configured to power the drive wheel or a further drive wheel.

The drivetrain system may also include a second freewheel mechanism connected between the shaft and the drive wheel such that the drive wheel moves forwards without back-driving the first motor or the crank.

The drivetrain system may also comprise a transmission connected between one of: the first motor and the second freewheel mechanism; the second freewheel mechanism and the drive wheel; and the first freewheel mechanism and the first motor.

Also disclosed herein is a three-wheeled vehicle installed with a drivetrain system, the drivetrain system comprising:

a crank configured to be rotated by a human; a shaft driven by the crank; a drive wheel of a three-wheeled vehicle configured to be driven by the shaft; a first motor configured to power the shaft; a first freewheel mechanism connected between the crank and the shaft such that the first motor powers the shaft to drive the drive wheel of the three-wheeled vehicle forwards without back-driving the crank; and a second motor configured to power the drive wheel or a further drive wheel of the three-wheeled vehicle.

The vehicle may also include a second freewheel mechanism connected between the shaft and the drive wheel such that the drive wheel of the three-wheeled vehicle moves forwards without back-driving the first motor or the crank.

Further disclosed herein is a method for powering a human-powered vehicle comprising: driving a shaft with a first motor; driving a crank by a human, the crank driving the shaft via a first freewheel mechanism such that the first motor drives the shaft without back-driving the crank; driving a drive wheel by a second motor; and driving at least one of the drive wheel and a further drive wheel by the shaft, the shaft driving the at least one of the drive wheel and further drive wheel via a second freewheel mechanism such that the at least one of the drive wheel and further drive wheel moves forwards without back-driving the first motor or the crank.

BRIEF DESCRIPTION OF DRAWINGS

The following drawings illustrate embodiments of the invention, which should not be construed as restricting the scope of the invention in any way.

FIG. 2 is a top view of a first exemplary embodiment of the drivetrain system.

FIG. 3 is a side view of the first exemplary embodiment of the drivetrain system.

FIG. 5 is a top view of a second exemplary embodiment of the drivetrain system.

FIG. 6 is a side view of the second exemplary embodiment of the drivetrain system.

DESCRIPTION

A. Glossary

Cadence—The rate at which a cyclist or other driver of a human-powered vehicle turns the pedals. Cadence is measured, for example, in revolutions per minute. The cadence should be suitable for the cyclist, because, for example, spinning a crank too fast can be uncomfortable.

Back-Driving—When a driven wheel of a vehicle is rotated by means other than its primary driving mechanism, then back-driving refers to operating the primary driving mechanism as if it were powering the driven wheel. For example, a bicycle with no freewheel mechanism that is moving downhill under the influence of gravity alone has a back-driven crank because it will be rotating, even though the cyclist will not be powering it.

Gear Motor—This is a motor with gears incorporated in order to reduce the output shaft speed and increase the output shaft torque.

B. Overview

Figure 1:
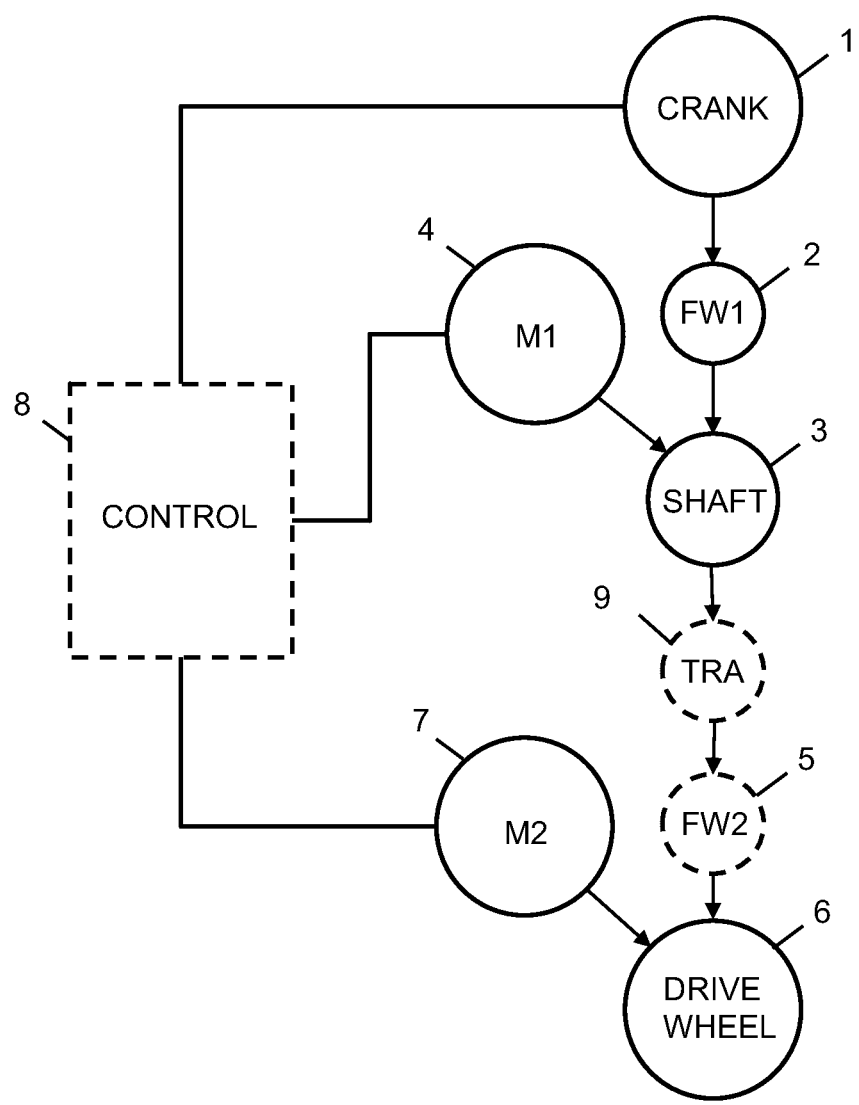
FIG. 1 is a schematic diagram of a basic drivetrain system according to the invention.

Referring to FIG. 1, a simplified diagram of a basic drivetrain system for a human-powered vehicle is shown, being incorporated in each of the three exemplary embodiments of drivetrain systems 10, 100 and 200 described in detail later in reference to FIGS. 2-4, 5-7 and 8-10, respectively. Included in the drivetrain system is a crank 1, which is configured to be powered by a human, for example using pedals attached to it. The crank 1 drives, via a first freewheel mechanism 2, a shaft 3. The first freewheel mechanism 2 allows the shaft 3 to rotate in the forward direction without the crank being back-driven. The shaft 3 is also driven by a first motor 4, and may be powered completely by the first motor, partially by the first motor, or not at all by the first motor. Shaft 3 in turn drives, via an optional second freewheel mechanism 5, the drive wheel 6. If included, the second freewheel mechanism 5 allows the drive wheel 6 to rotate in the forward direction without the first motor 4 or the crank 1 being back-driven. The drive wheel 6 is also driven by a second motor 7. The drive wheel 6 may be powered completely by the second motor 7, partially by the second motor, or not at all by the second motor. Furthermore, the drive wheel 6 may be driven in reverse by the second motor 7. Drive power transmitted between the pedals, crank 1, shaft 3, motors 4, 7 and drive wheel 6 may either be direct or indirect depending on the embodiment.

If the drivetrain system does not include the optional second freewheel mechanism 5, then, when the drive wheel 6 is rotated in the forward direction, the first motor 4 and shaft 3 will be back-driven. However, the crank 1 will not be back-driven due to the presence of the first freewheel mechanism 2.

Figure 11:
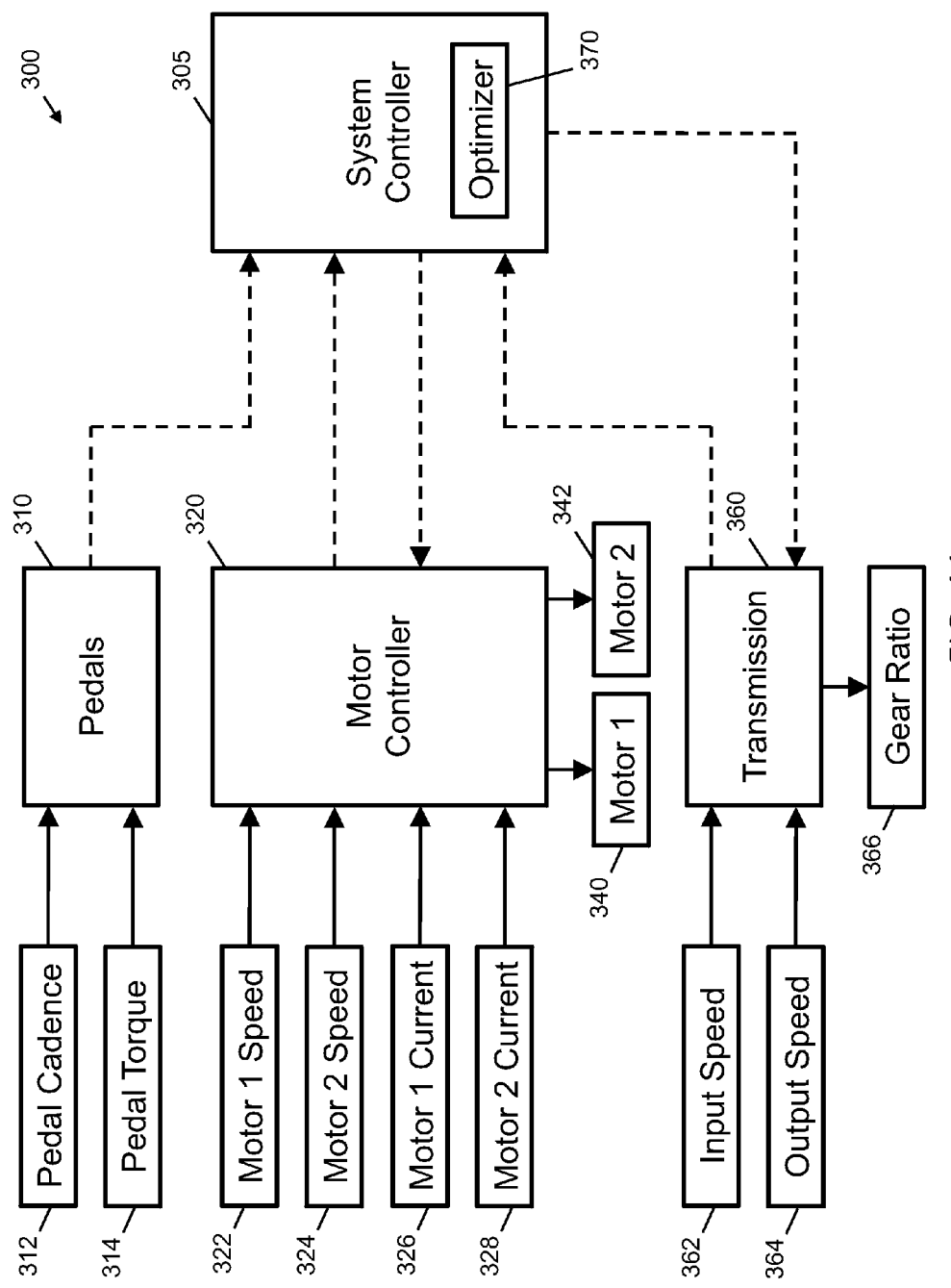
FIG. 11 is a schematic representation of an exemplary embodiment of a control system for the drivetrain systems, including its connected input and output modules.

An optional system control 8, generally representing a control system 300 described in detail later in reference to FIG. 11, is connected to the motors 4, 7 and the crank 1. The system control 8 takes inputs from one or more sensors on the crank 1 and motors 4, 7 and provides control signals to the motors. The control signals optimize the amount of power used to drive the motors.

A transmission 9 may be included in the powertrain system, and may also be connected to the system control 8. If a transmission is included in the drivetrain system, then the second freewheel mechanism 5 will be required if the transmission cannot be back-driven. The transmission should therefore be installed in the drivetrain system upstream of the second freewheel mechanism.

While a single drive wheel 6 has been shown, there may in some embodiments be two or more drive wheels. For example, the crank 1 and first motor 4 may drive the drive wheel 6, and the second motor 7 may drive a further drive wheel in the same vehicle as the first drive wheel 6. This may be the case for a tricycle, for example, in which the two rear wheels are powered by different portions of the drivetrain system. In other embodiments, even in a tricycle, all of the crank 1, first motor 4 and second motor 7 may be configured to power a single drive wheel.

C. Exemplary Embodiments

Figure 4:
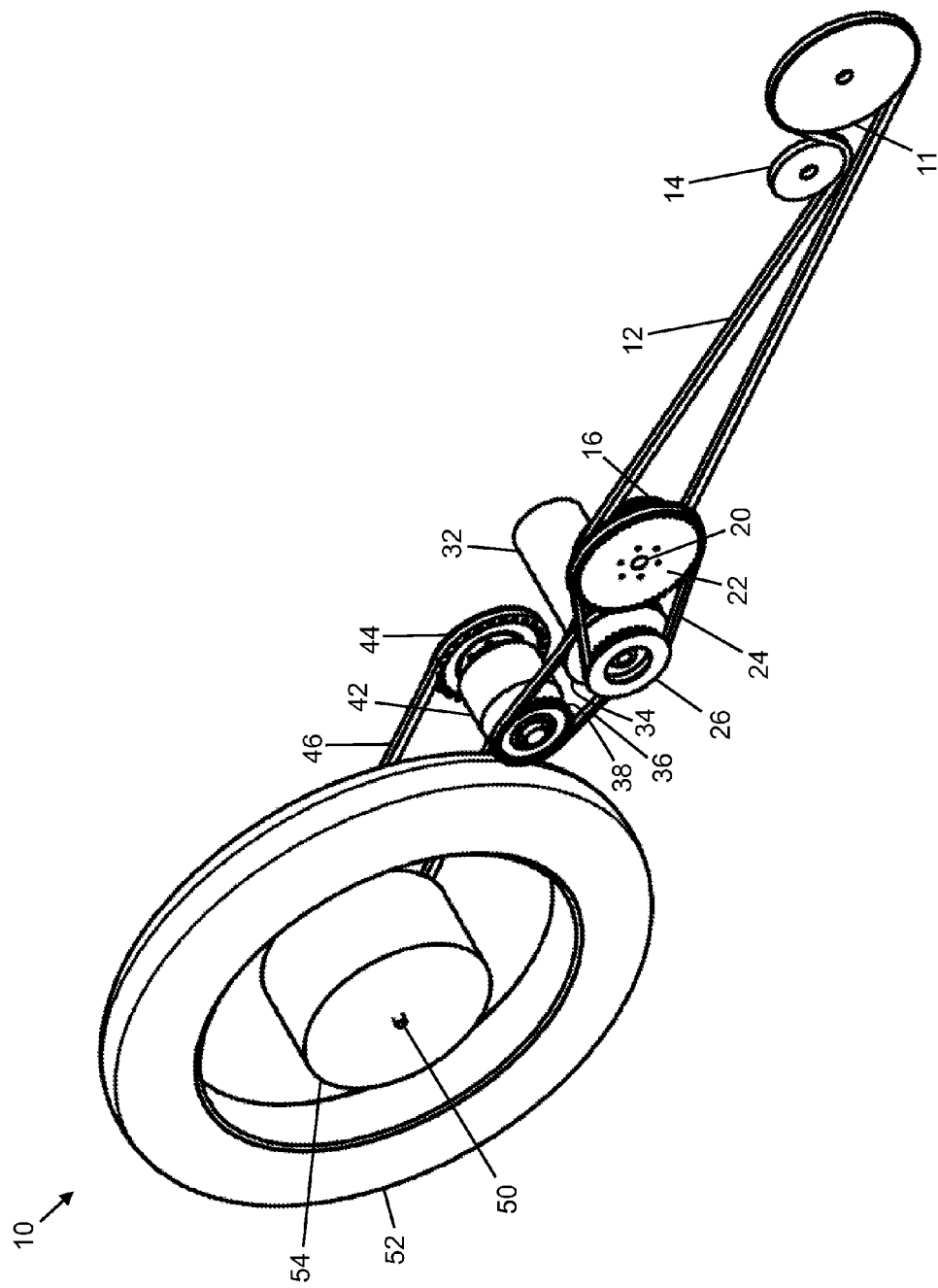
FIG. 4 is a perspective view of the first exemplary embodiment of the drivetrain system.

Referring to FIGS. 2-4, an exemplary embodiment of the drivetrain system, generally designated 10, is shown in various views. Crank 11, which is fitted with pedals, is powered by a driver of a vehicle in which the drivetrain system 10 is installed. A belt or chain 12, tensioned by an idler wheel 14, connects the crank 11 to a wheel 16 that is mounted on an intermediate shaft 20. The intermediate shaft 20 is connected to a wheel 22, which in turn is connected by a belt or chain 24 to a first freewheel 26 on first motor shaft 30. Wheels 16, 22 may be of different sizes in order to provide suitable gearing. The mechanism of the first freewheel 26 allows the vehicle to move forward without the need to back-drive the crank 11. Connected to motor shaft 30 is a first electric motor 32 and further wheel 34. As the crank 1 is rotated in the forward direction, it causes both the intermediate shaft 20 and the first motor shaft 30 to rotate. The first electric motor 32, which may be a gear motor, may be powered to drive the first motor shaft 30 and wheel 34 in the forward direction (i.e. forward direction of the vehicle), either entirely or by adding power to the power that is provided by the driver turning the crank 1. If no electrical power is supplied to the first motor 32, it will still rotate as the crank is rotated.

Wheel 34 on first motor shaft 30 is connected by a belt or chain 36 to a wheel 38 that is mounted on a transmission input shaft 40. Transmission 42 is connected to and takes its drive input from input shaft 40. As the transmission shaft 40 is rotated, the transmission transfers power to wheel 44 mounted on the transmission output shaft 45. The transmission 42 is, for example, a variable gear ratio transmission, such as a continuously variable automatic transmission.

Wheel 44 is connected via belt or chain 46 to a second freewheel 48 mounted on the axle 50 of drive wheel 52. The optional mechanism of freewheel 48 allows the drive wheel 52 to rotate forwards without back-driving the first motor 32 or the crank 1. In some cases, the freewheel 48 is necessary because the transmission may not be able to be back-driven.

A second motor 54, which may also be a gear motor, is connected directly to the drive wheel 52. The second motor 54 can be used to add power to the drive wheel 52 in either forward or reverse directions, and can also be used to recover energy by reducing vehicle speed, otherwise known as regenerative braking. Second motor 54 may be a hub motor or a wheel motor, and drives the drive wheel 52 directly. The second motor 54 is connected to the drive wheel 52 without a freewheel mechanism so that it can drive the drive wheel in both forward and reverse directions.

Figure 7:
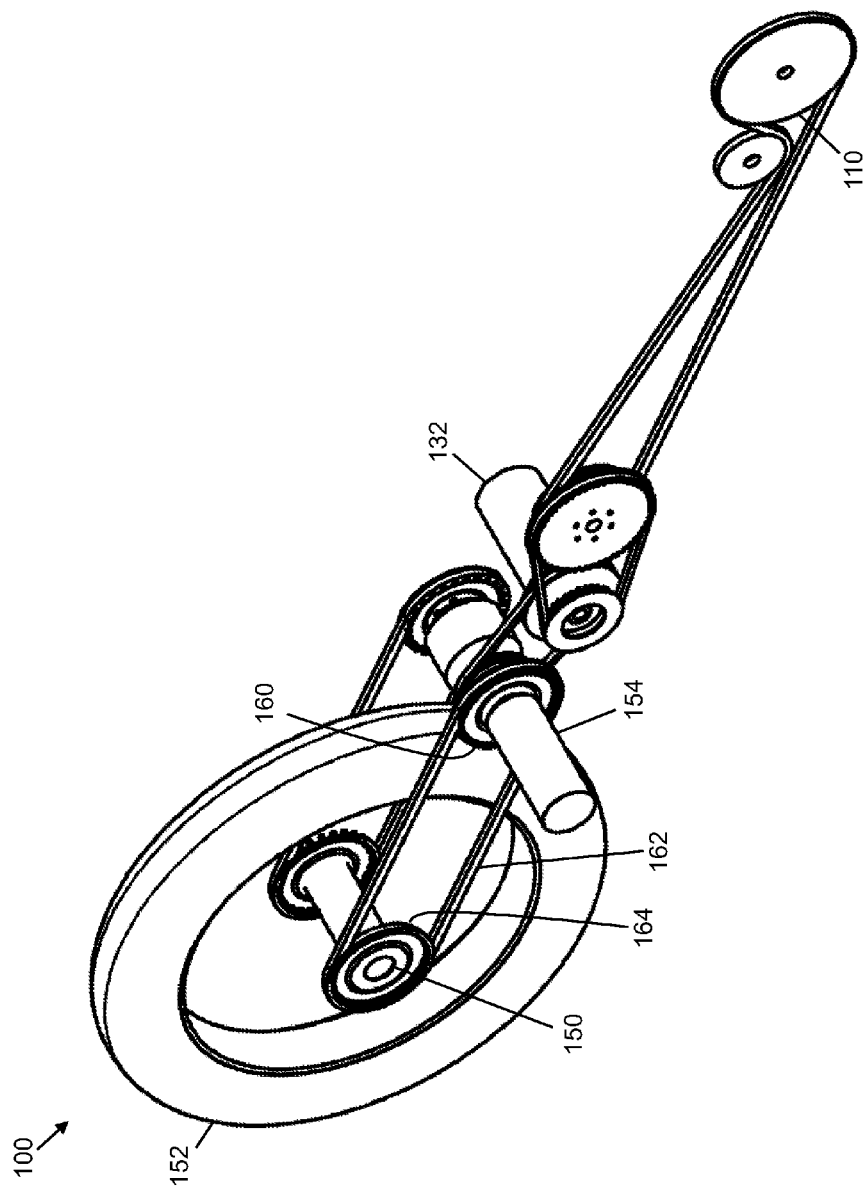
FIG. 7 is a perspective view of the second exemplary embodiment of the drivetrain system.

A second exemplary embodiment of the drivetrain system, generally designated 100, is shown in FIGS. 5-7, in different views. Much of the drivetrain system 100 is similar to that of the first embodiment 10, such as the crank 110 and first motor 132, which are used with the same arrangement of connecting shafts, belts, chains and/or wheels to provide human and electrical power respectively to the drive wheel 152 mounted on axle 150. One difference in drivetrain system 100 is that the second motor 154 is located off-axis from the axle 150 of the drive wheel 152. Second motor 154 drives wheel 160 that is connected via belt or chain 162 to wheel 164 mounted on the axle 150 of the drive wheel 152.

Figure 8:
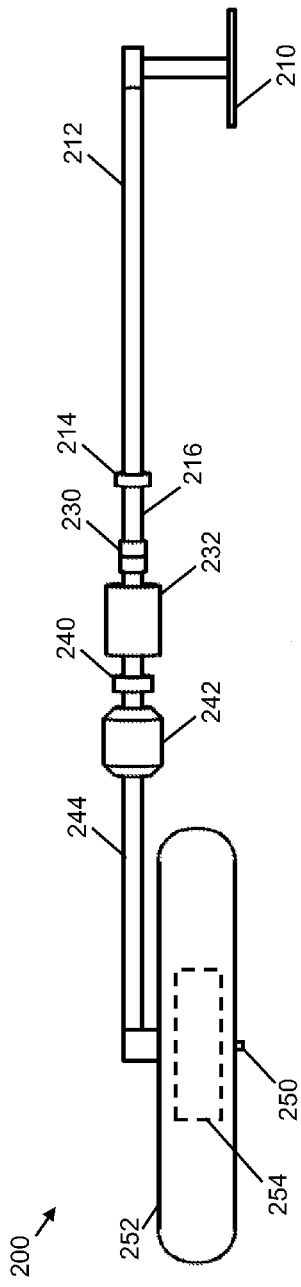
FIG. 8 is a top view of a third exemplary embodiment of the drivetrain system.
Figure 9:
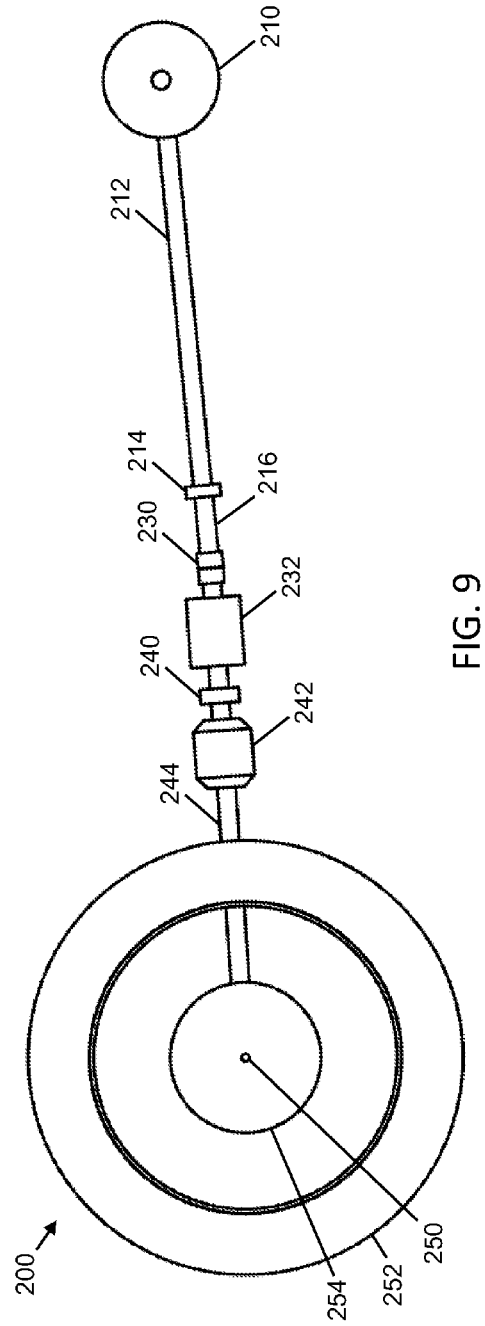
FIG. 9 is a side view of the third exemplary embodiment of the drivetrain system.
Figure 10:
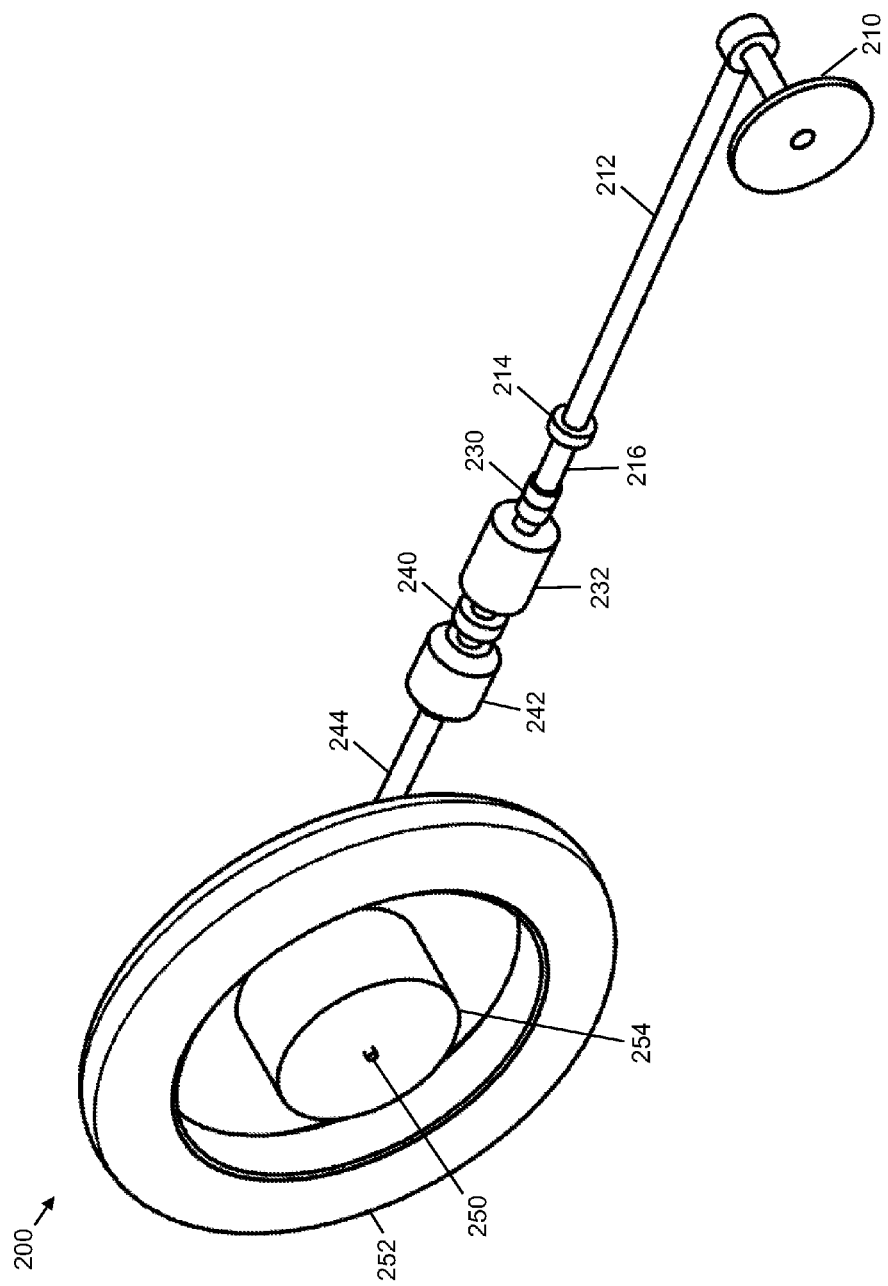
FIG. 10 is a perspective view of the third exemplary embodiment of the drivetrain system.

A third exemplary embodiment of the drivetrain system, generally designated 200, is shown in FIGS. 8-10. A driver pedals to turn the crank 210, which is connected to a shaft 212 which rotates when the crank is turned. The shaft 212 is connected to a freewheel mechanism 214, which allows the vehicle to move forwards without the crank 210 being back-driven. The freewheel mechanism 214 is in turn connected to shaft 216, which is connected via a universal joint 230 to first motor 232. The first motor 232 is in turn connected, via another optional freewheel mechanism 240 to the transmission 242. If desired, the freewheel mechanism 240 allows the drive wheel 252 to rotate forwards without back-driving the first motor 232 or the crank 210. The transmission 242 drives the transmission output shaft 244, which in turn rotates the drive wheel 252 mounted on axle 250. A second motor 254 of the drivetrain system 200 is connected to the drive wheel 252 to directly drive the drive wheel 252 in either a forward or reverse direction, and for regenerative braking.

Alternately, the second motor 254 may be located off-axis from the axle 250 of the drive wheel 252, as in the preceding drivetrain system 100 of FIGS. 5-7. In this case, power to the drive wheel 252 may be supplied from the off-axis second motor 254 via a belt, chain or shaft.

D. Control System

Referring to FIG. 11, an exemplary embodiment of the control system, generally designated 300, is shown, with its main modules and connections to the modules and components it controls. Corresponding ones of the components described below (such as motors 340, 342 and transmission 360) with reference to the control system 300 will be readily recognized in the exemplary embodiments of the drivetrain systems 10, 100 and 200 described in detail above. The control system 300 includes a system controller 305 for controlling first and second motors 340, 342 and the transmission 360 of the control system 300. The system controller 305 controls these components in order to maximize vehicle performance under various driving conditions. For example, if the vehicle goes up a hill, the gear ratio will change to allow for higher torque to be applied to the drive wheel. Vice versa, at high vehicle speeds the gear ratio will change up to allow for lower user cadence at higher drive wheel speeds.

The system controller 305 receives inputs from the pedal module 310, which in turn receives its inputs from one or more sensors connected to the pedals and/or crank. Such sensors may be a cadence sensor 312 and a torque sensor 314.

The system controller 305 also receives inputs from the motor controller 320, and also provides outputs to it. The motor controller 320 receives inputs from various sensors attached to the aforementioned components of the drivetrain systems 10, 100 and 200, such as a speed sensor 322 for the first motor 340, a speed sensor 324 for the second motor 342, a current sensor 326 for the first motor 340 and a current sensor 328 for the second motor 342. Based upon the inputs received from the sensors 322-328 and the input received from the system controller 305, the motor controller 320 sends control signals to the first motor 340 and the second motor 342 in order to control the electrical power applied to them.

When the vehicle is using electrical power to drive, or assist with driving, the drive wheel, an optimizer module 370 in the system controller 305 calculates the optimum power split between the two motors 340, 342. Alternately, the optimizer module 370 may be located in the motor controller 320. The split is calculated so that, as far as possible, both motors 340, 342 are being driven in their optimum efficiency ranges while still achieving vehicle torque and power output as the user is expecting. If this is not possible, the motors are driven so that their combined efficiency is optimal.

The system controller 305 also receives inputs from the transmission 360, which in turn receives inputs from a sensor 362 on its input shaft and a sensor 364 on its output shaft. The transmission module 360, as a result of receiving signals from the sensors 362, 364 and from the system controller 305, sends output control signals to the gear ratio control module 366 in the transmission.

The control system 300 requires the driver to pedal backwards in order to initiate reverse power from the motors, so that the driver must pedal faster than the crank would normally rotate. This makes it so that the driver does not feel like the crank is being back-driven when the vehicle moves in reverse. When the vehicle is driven in reverse, the crank rotates in reverse. This may occur, for example, when the vehicle is rolling backwards downhill.

The system controller 305 and its connected modules may be embodied in software, firmware and/or hardware.

E. Variations

Although the invention has been described in relation to rear wheel drive vehicles, it is also applicable to vehicles that are front wheel drive, which may also be rear-wheel steered. Besides use in three wheeled human powered vehicles, the disclosed drivetrain could, however, be used in any mechanism or device that uses a driven wheel, such as wheel chairs and/or other assistive technologies and devices.

While many of the embodiments have been described in relation to a single drivetrain in which the three power sources (crank and two motors) power a single drive wheel, all of these embodiments may be split into the two portions of a drivetrain system, in which the crank and first motor power one drive wheel and the second motor powers another drive wheel.

The first motor 32 could be attached to the intermediate shaft 20 by a belt, chain, shaft or gear, rather than in-line.

Freewheel mechanisms can be located in positions other than those depicted in the embodiments described herein. For example, in drivetrain 1, instead of a freewheel mechanism being located in freewheel 48 on the axle 50, it may instead be located at wheel 44.

The electric motors may be located in different positions to those that have been shown. For example, the first motor may be located between the transmission and drive wheel. As another example, the first motor may be located between the crank and the intermediate shaft. In other embodiments, the first motor may directly power the crank (i.e. the shaft of the crank) or directly power the intermediate shaft.

The drivetrain may also be used with motors other than electrical motors.

The second motor may be used to drive a second drive wheel. For example, on a tricycle, the drivetrain would be configured to drive a first drive wheel using the crank and the first motor and the second drive wheel using the second motor. The drivetrain system may also conceivably be split in a bicycle, for example, in which the crank and the first motor power the rear wheel and the second motor powers the front wheel.

If a transmission that allows reverse and forward power to be transferred back from the drive wheel through the transmission to the transmission input were used, then the drivetrain would retain its functionality without the need for a second motor. This would be accomplished by removing the freewheel between the drive wheel and the first motor. A freewheel would still be needed between the first motor and the crank to allow the vehicle to travel forward without back-driving the crank.

In general, unless otherwise indicated, singular elements may be in the plural and vice versa with no loss of generality.

Throughout the description, specific details have been set forth in order to provide a more thorough understanding of the invention. However, the invention may be practiced without these particulars. Some components may be omitted while others may be added, without departing from the invention. In other instances, well known elements have not been shown or described in detail to avoid unnecessarily obscuring the invention. Accordingly, the specification and drawings are to be regarded in an illustrative, rather than a restrictive, sense.

It will be further appreciated that the line between hardware, firmware and software is not always sharp, it being understood by those skilled in the art that the software implemented modules and processes described herein may be embodied in hardware, firmware, software, or any combination thereof. Such processes may be controlled by coded instructions such as microcode and/or by stored programming instructions in one or more non-transient media readable by a computer or processor. The code modules may alternately be stored in any computer storage system or device, such as hard disk drives, solid-state memories, etc. The methods may alternatively be embodied partly or wholly in specialized computer hardware, such as ASIC or FPGA circuitry.

It will be clear to one having skill in the art that variations to the specific details disclosed herein can be made, resulting in other embodiments that are within the scope of the invention disclosed. All parameters, dimensions and configurations described herein are examples only and actual values of such depend on the specific embodiment. Accordingly, the scope of the invention is to be construed in accordance with the substance defined by the following claims.

The invention claimed is:

1. A drivetrain system for a human-powered vehicle comprising:
   a crank configured to be rotated by a human;
   a shaft driven by the crank;
   a drive wheel configured to be driven by the shaft;
   a first motor configured to power the shaft;
   a first freewheel mechanism connected between the crank and the shaft such that the first motor powers the shaft to drive the drive wheel forwards without back-driving the crank;
   a second freewheel mechanism connected between the shaft and the drive wheel such that the drive wheel moves forwards without back-driving the first motor or the crank;
   a second motor configured to power the drive wheel or a further drive wheel;
   a transmission connected between one of:
     the first motor and the second freewheel mechanism;
     the second freewheel mechanism and the drive wheel; and
     the first freewheel mechanism and the first motor; and
   a controller connected to:
     a sensor configured to sense pedal cadence;
     a sensor configured to sense pedal torque;
     a sensor configured to sense speed of the first motor;
     a sensor configured to sense speed of the second motor;
     a sensor configured to sense current drawn by the first motor;
     a sensor configured to sense current drawn by the second motor;
     a sensor configured to sense input shaft speed of the transmission;
     a sensor configured to sense output shaft speed of the transmission;
     the first and second motors; and
     the transmission;

wherein the controller is configured to optimize a combined efficiency of the first and second motors when both first and second motors are powering the vehicle.

2. The drivetrain system of claim 1, wherein the transmission is a continuously variable automatic transmission.

3. The drivetrain system of claim 1, wherein the crank drives the shaft directly.

4. The drivetrain system of claim 1, wherein the crank drives the shaft indirectly, via one or more of a belt, chain and intermediate shaft.

5. The drivetrain system of claim 1, wherein the first motor powers the shaft directly.

6. The drivetrain system of claim 1, wherein the first motor powers the shaft indirectly, via one or more of a belt, chain and further shaft.

7. The drivetrain system of claim 1, wherein the second motor powers the drive wheel directly.

8. The drivetrain system of claim 1, wherein the second motor powers the further drive wheel.

9. The drivetrain system of claim 1, wherein the second motor powers the drive wheel indirectly via a belt, chain or shaft.

10. The drivetrain system of claim 1, wherein the second motor is a hub motor.

11. The drivetrain system of claim 1, wherein the second motor is configured to drive the vehicle in a reverse direction.

12. The drivetrain system of claim 1, wherein the controller operates the second motor so as to reverse the vehicle when the crank is rotated in a reverse direction.

13. The drivetrain system of claim 1, wherein the second motor generates electrical energy when the vehicle is braked.

14. A three-wheeled vehicle installed with a drivetrain system, the drivetrain system comprising:
   a crank configured to be rotated by a human;
   a shaft driven by the crank;
   a drive wheel of the three-wheeled vehicle configured to be driven by the shaft;
   a first motor configured to power the shaft;
   a first freewheel mechanism connected between the crank and the shaft such that the first motor powers the shaft to drive the drive wheel forwards without back-driving the crank;
   a second freewheel mechanism connected between the shaft and the drive wheel such that the drive wheel moves forwards without back-driving the first motor or the crank;
   a second motor configured to power the drive wheel or a further drive wheel of the three-wheeled vehicle;
   a transmission connected between:
      the first motor and the second freewheel mechanism;
      the second freewheel mechanism and the drive wheel; or
      the first freewheel mechanism and the first motor; and
   a controller connected to:
      a sensor configured to sense pedal cadence;
      a sensor configured to sense pedal torque;
      a sensor configured to sense speed of the first motor;
      a sensor configured to sense speed of the second motor;
      a sensor configured to sense current drawn by the first motor;
      a sensor configured to sense current drawn by the second motor;
      a sensor configured to sense input shaft speed of the transmission;
      a sensor configured to sense output shaft speed of the transmission;
      the first and second motors; and
      the transmission;
   wherein the controller is configured to optimize a combined efficiency of the first and second motors when both first and second motors are powering the vehicle.

15. A method for powering a human-powered vehicle comprising:
   driving a shaft with a first motor;
   driving a crank by a human, the crank driving the shaft via a first freewheel mechanism such that the first motor drives the shaft without back-driving the crank;
   driving a drive wheel by the shaft, the shaft driving the drive wheel via a second freewheel mechanism such that the drive wheel moves forwards without back-driving the first motor or the crank;
   driving the drive wheel or a further drive wheel by a second motor; and
   optimizing, by a controller, a combined efficiency of the first and second motors when both first and second motors are powering the vehicle, wherein the controller is connected to:
      a sensor configured to sense pedal cadence;
      a sensor configured to sense pedal torque;
      a sensor configured to sense speed of the first motor;
      a sensor configured to sense speed of the second motor;
      a sensor configured to sense current drawn by the first motor;
      a sensor configured to sense current drawn by the second motor;
      a sensor configured to sense input shaft speed of a transmission that is connected between:
         the first motor and the second freewheel mechanism;
         the second freewheel mechanism and the drive wheel; or
         the first freewheel mechanism and the first motor;
      a sensor configured to sense output shaft speed of the transmission;
      the first and second motors; and
      the transmission.

* * * * *